TUNABLE RADIO FREQUENCY FILTER

Filed May 24, 1946 2 SHEETS—SHEET 1

INVENTOR
SEYMOUR B. COHN

BY
William D. Hall
ATTORNEY

Dec. 4, 1951 S. B. COHN 2,577,511

TUNABLE RADIO FREQUENCY FILTER

Filed May 24, 1946 2 SHEETS—SHEET 2

INVENTOR
SEYMOUR B. COHN
BY William D. Hall
ATTORNEY

Patented Dec. 4, 1951

2,577,511

UNITED STATES PATENT OFFICE 2,577,511

TUNABLE RADIO FREQUENCY FILTER

Seymour B. Cohn, Cambridge, Mass., assignor to United States of America as represented by the Secretary of War Application May 24, 1946, Serial No. 672,018

3 Claims. (Cl. 178—44)

This invention relates generally to electrical apparatus and more particularly to radio frequency filters.

At high radio frequencies, circuit elements providing capacitive reactance and inductive reactance lose their usual identity as capacitors and inductors and no longer physically resemble conventional layer capacitors or wire wound inductors. For example, a single length of wire may present an inductive reactance at one frequency and a capacitive reactance at a second frequency.

At ultra-high frequencies, a wavelength may be long compared to the length of a component of an electrical circuit, consequently, a new technique has been developed pertaining to high frequencies. For example, a band-pass filter may be required for use at ultra-high frequencies. The circuit constants required to obtain such a filter are readily calculated by the use of well known formulas. However, conventional capacitors and inductors cannot readily be used at these high frequencies and the physical structure required to provide the appropriate circuit constants are difficult to obtain.

It is an object of the present invention to provide a band-pass filter for use at ultra-high frequencies.

It is also an object to provide a band-pass filter tunable over wide ranges of frequencies.

It is another object to provide a band-pass filter conveniently usable with conventional coaxial transmission lines.

A filter which accomplishes the aforesaid objects consists of two short lengths of tapered coaxial transmission line, each terminated at one end by a standard coaxial cable connector and terminated at the other end by a thin metallic plate. These two plates, which terminate the two tapered coaxial transmission lines, also serve as the ends of a rectangular box which forms a resonant cavity. Several holes are drilled in each end plate to allow entrance and exit of R. F. energy to and from the cavity. In the center of the cavity, a tuning rotor is inserted between the ends of two large rectangular conductors, each of which terminates in contact with one of the end plates of the resonant cavity. The tuning rotor is mounted on a shaft which is supported by two opposing side plates of the resonant cavity.

Other objects, features and advantages of this invention will suggest themselves to those skilled in the art and will become apparent from the following description of the invention taken in connection with the accompanying drawings in which.

Figure 1:
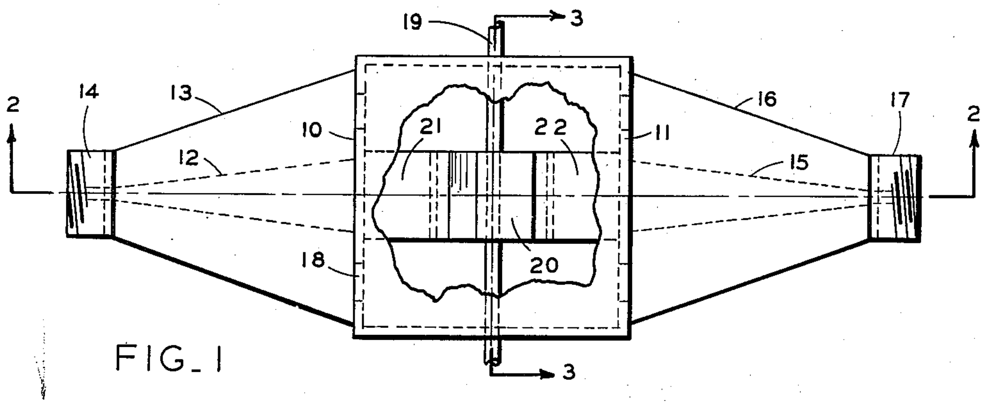
Fig. 1 is a plan view with a portion cut away showing the tuning rotor of a band-pass filter embodying the principles of this invention.

Referring again to Fig. 1, a rectangular box having end plates 10 and 11 forms a resonant cavity. A tapered coaxial cable consisting of inner conductor 12 and outer conductor 13 is terminated at one end by a standard connector 14 and is terminated at the other end by end plate 10. Similarly, a second tapered coaxial cable consisting of inner conductor 15 and outer conductor 16 is terminated at one end by a standard connector 17 and terminated at the other end by end plate 11. In each of end plates 10 and 11, several holes, such as 18, are drilled. Holes are also drilled in the center of two opposing sides of the box forming the cavity and a shaft 19 is inserted through the cavity through these holes. A rotor 20 is mounted on shaft 19 and is spaced between the peripheries of two rectangular conductors 21 and 22, respectively. The other ends of conductors 21 and 22 terminate in contact with end plates 10 and 11 respectively.

Figure 2:
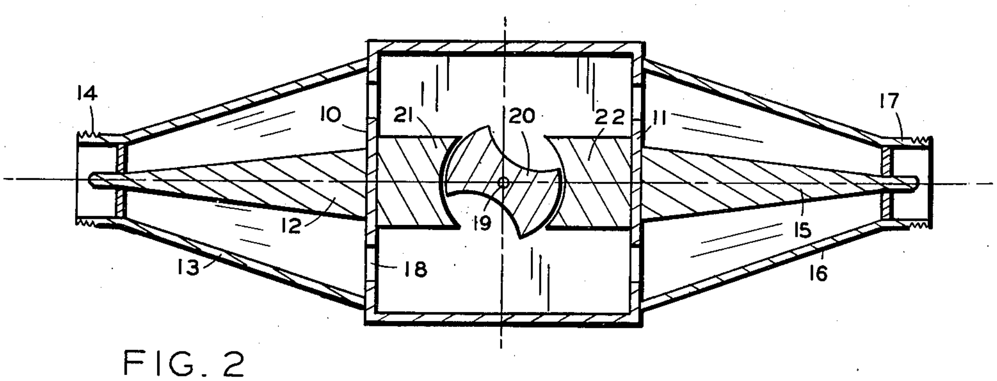
Fig. 2 is a sectional view of Fig. 1 taken at section 2—2.
Figure 3:
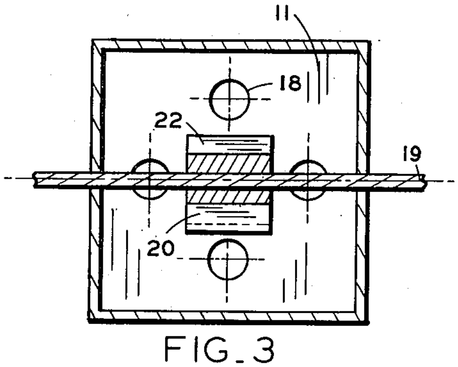
Fig. 3 is a sectional view of Fig. 1 taken at section 3—3.

Referring now to Figs. 2 and 3, details of the arrangement of the components of the filter can be seen.

Figure 4A:
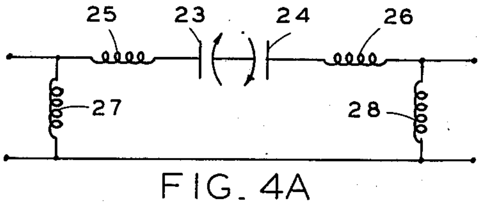
Figs. 4A and 4B are equivalent circuits of the filter shown in Fig. 1.

Fig. 4A is an equivalent circuit of the filter shown in Fig. 1 and consists of capacitors 23 and 24 and inductors 25, 26, 27 and 28.

Figure 4B:
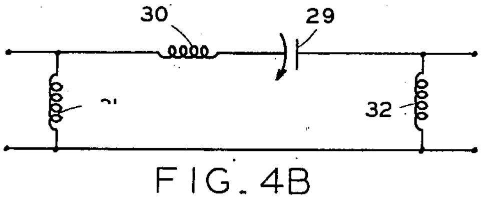

Fig. 4B is an equivalent circuit of Fig. 4A and consists of capacitor 29 and inductors 30, 31 and 32. Obviously, inductor 30, (Fig. 4B) is the equivalent of the combination of inductors 25 and 26, (Fig. 4A), and capacitor 29, (Fig. 4B) is the equivalent of the combination of capacitors 23 and 24, (Fig. 4A).

Figure 5:
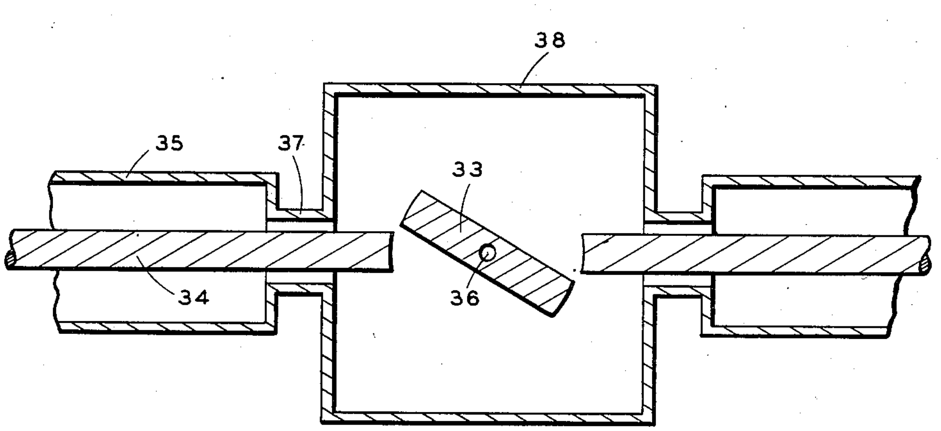
Fig. 5 is a sectional view of a band-pass filter which is a modification of the filter shown in Fig. 1; and, Fig. 6 is an equivalent circuit of the filter shown in Fig. 5.

Fig. 5 shows an alternate type of band-pass filter consisting of a tuning rotor 33 and a coaxial transmission line having an inner conductor 34 and an outer conductor 35. Rotor 33 is mounted on a shaft 36 and is inserted between the two ends of inner conductor 34. At each side of rotor 33, such as at point 37, the diameter of the outer conductor 35 is decreased to increase the capacitance between inner conductor 34 and outer conductor 35.

Between the two points where the diameter of the outer conductor 35 has been decreased, outer conductor 35 has been increased in diameter as shown at point 38, to form a resonant cavity physically centered about rotor 33.

Figure 6:
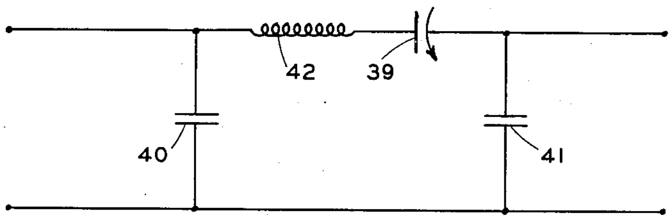

A schematic representation of the filter of Fig. 5 is shown in Fig. 6 and consists of capacitors 39, 40 and 41 and inductor 42.

Referring again to Figs. 2 and 4A, it can be seen that the perforated end plate 10, which terminates inner conductor 12 and outer conductor 13, is in effect, a shunt inductance represented by inductor 27. Similarly, end plate 11, which terminates inner conductor 15 and outer conductor 16, is represented by inductor 28.

The inductance of the conductors 21 and 22 is represented by inductors 25 and 26. The capacitive effect between the periphery of rotor 20 and conductors 21 and 22, is represented by capacitors 23 and 24.

The diagram in Fig. 4A may be simplified, resulting in the diagram shown in Fig. 4B. Such a circuit as shown in Fig. 4B has been analyzed before and need not be examined in detail here. It need only be stated that such a circuit has a band-pass characteristic. Obviously, the band of frequencies to which this circuit is tuned may be varied by the rotation of tuning rotor 20.

The upper frequency limit of this filter occurs when the rotor capacitance is a minimum. This upper limit will occur at a frequency for which the length of the cavity is somewhat less than one-half of a wavelength. The lower frequency limit occurs when rotor 20 is rotated to a position of maximum capacitance. This lower limit occurs at a frequency for which the maximum rotor capacitance and the series inductance of the cavity is resonant. This corresponds to the resonant frequency of the combination of capacitor 29 and inductor 30 of Fig. 4B.

Thus, the apparatus shown in Fig. 1 is a band-pass filter, readily tunable by rotary motion of its tuning rotor.

An obvious application of this invention is its use as a pre-selector in ultra-high frequency radio receivers. By placing this filter between a receiver and its antenna, selectivity would be increased and noise would be reduced.

Whereas the apparatus shown in Fig. 1 is a shunt inductance type filter, it may be slightly modified to provide a shunt capacitance type filter.

Referring now to Figs. 5 and 6, it is obvious that the shunt capacitance between inner conductor 34 and outer conductor 35 at points such as 37, can be represented schematically by capacitors 40 and 41. The capacitance between rotor 33 and inner conductors 34 can also be represented by a series capacitor 39 and the series inductance of the cavity can be represented by inductor 42.

A filter represented schematically by Fig. 6 also has a band-pass characteristic and operates similarly to the filter shown in Fig. 1.

A secondary characteristic of the filters herein disclosed, pertains to spurious pick-up and radiation. The fact that these filter units are completely shielded is decidedly an asset.

A filter has been constructed substantially as shown in Fig. 1. This filter was tunable between the ranges of 650 megacycles and 2100 megacycles with a band width of several megacycles.

While there has been here described what is at present considered to be the preferred embodiment of the invention, it will be obvious to those skilled in the art that various changes and modifications may be made therein without departing from the scope of the invention.

An important feature of this invention is that the bearings for the rotor shaft are located at points of negligible current flow, and hence tuning noise due to the bearings is negligible.

What is claimed is:

1. A tunable band-pass radio frequency filter comprising a cavity resonator, first and second axially aligned coaxial cables, said first coaxial cable having a tapered inner conductor and a like tapered outer conductor, the small end of said first cable being terminated by a standard cable connector and the large end of said first cable being terminated by a first wall of said cavity resonator, said second coaxial cable having a tapered inner conductor and a like tapered outer conductor, the small end of said second cable being terminated by a standard cable connector and the large end of said second cable being terminated by a second wall of said cavity resonator that is oppositely disposed with respect to said first wall, a pair of probes extending inwardly into said cavity resonator and axially aligned with said first and second coaxial cable, said probes being disposed in said opposite walls of said cavity resonator, the innermost surfaces of said probes being concave, a tuning rotor positioned between said probes and rotatably mounted on an axis transverse to the axis of said probes, said rotor having a pair of opposite surfaces that are convex and complementary with said concave surfaces and having a second pair of oppositely disposed concave surfaces intermediate said convex surfaces, the relative positions of the periphery of said rotor convex surfaces and said probe concave surfaces determining the value of the effective series capacitance of said cavity resonator.

2. A turnable band-pass radio frequency filter comprising a hollow metallic cavity resonator having a plurality of walls, first and second axially aligned coaxial cables, each having a tapered inner conductor and a like tapered outer conductor, a cable connector on the small end of each cable, the large end of said first cable being terminated by a first wall of said resonator with its inner conductor directly connected to the center of said wall, the large end of said second cable being terminated by a second wall of said cavity resonator that is opposite said first wall, the inner conductor of said second cable being directly connected to the center of said second wall, said first and said second walls each having a plurality of apertures concentric about the inner conductor which is connected thereto, said first and said second walls thereby acting as shunt inductances across said first and second cables, respectively, and as coupling means between the cavity resonator and the respective cables, a pair of probes extending inwardly into said cavity resonator said axially aligned with said first and said second coaxial cables, said probes being disposed respectively on said first and second walls of said cavity resonator, and rotatable tuning means disposed between the innermost surfaces of said probes, whereby the relative positions of said means and said innermost surfaces determine the pass frequencies of said filter.

3. A tunable band-pass radio frequency filter comprising a hollow metallic cavity resonator having a plurality of walls, first and second coaxial cables conductively connected to said cavity resonator at opposite walls thereof with the inner conductors thereof directly connected to said walls, said cables being axially aligned, said first and second walls each having a plurality of apertures therethrough, said first and second walls thereby acting as shunt inductances across said first and second cables and as coupling means between the cavity resonator and the respective cables, a pair of inwardly extending probes attached to said first and second walls respectively and axially aligned with said coaxial cables, and a tuning member within said cavity resonator rotatably mounted between said probes.

SEYMOUR B. COHN.

REFERENCES CITED

The following references are of record in the file of this patent:

UNITED STATES PATENTS

| Number | Name | Date |
|---|---|---|
| Re. 20,859 | Potter | Sept. 13, 1938 |
| 2,106,768 | Southworth | Feb. 1, 1938 |
| 2,227,372 | Webster | Dec. 31, 1940 |
| 2,262,020 | Llewellyn | Nov. 11, 1941 |
| 2,396,044 | Fox | Mar. 5, 1946 |
| 2,410,656 | Herold | Nov. 5, 1946 |
| 2,415,242 | Hershberger | Feb. 4, 1947 |
| 2,427,100 | Kihn | Sept. 9, 1947 |
| 2,442,671 | Tompkins | June 1, 1948 |